United States Patent
Huang

(10) Patent No.: US 10,671,732 B2
(45) Date of Patent: Jun. 2, 2020

(54) ELECTRONIC APPARATUS AND SECURE BOOT METHOD THEREOF

(71) Applicant: Wistron Corporation, New Taipei (TW)

(72) Inventor: Chien-Yu Huang, New Taipei (TW)

(73) Assignee: Wistron Corporation, New Taipei (TW)

( * ) Notice: Subject to any disclaimer, the term of this patent is extended or adjusted under 35 U.S.C. 154(b) by 209 days.

(21) Appl. No.: 15/486,321

(22) Filed: Apr. 13, 2017

(65) Prior Publication Data

US 2018/0165456 A1 Jun. 14, 2018

(30) Foreign Application Priority Data

Dec. 8, 2016 (TW) .............................. 105140563 A

(51) Int. Cl.
*G06F 21/57* (2013.01)
*G06F 13/42* (2006.01)
*G06F 9/4401* (2018.01)

(52) U.S. Cl.
CPC .......... *G06F 21/575* (2013.01); *G06F 9/4411* (2013.01); *G06F 13/4282* (2013.01)

(58) Field of Classification Search
CPC ... G06F 13/4282; G06F 21/575; G06F 9/4411
See application file for complete search history.

(56) References Cited

U.S. PATENT DOCUMENTS

| | | | | |
|---|---|---|---|---|
| 5,634,137 A | * | 5/1997 | Merkin | G06F 9/4401 710/10 |
| 5,991,826 A | * | 11/1999 | McGee | G06F 9/4411 710/10 |
| 7,249,266 B2 | * | 7/2007 | Margalit | G06F 21/34 713/189 |
| 7,409,563 B2 | * | 8/2008 | Howard | G06F 21/445 439/147 |
| 8,645,675 B2 | | 2/2014 | Gillespie | |
| 10,061,599 B1 | * | 8/2018 | Yakovlev | G06F 9/44505 |

(Continued)

FOREIGN PATENT DOCUMENTS

| | | |
|---|---|---|
| EP | 2207120 | 7/2010 |
| TW | 201109972 | 3/2011 |

OTHER PUBLICATIONS

"Office Action of Taiwan Counterpart Application," with partial English translation thereof, dated Jul. 25, 2017, p. 1-p. 15, in which the listed references were cited.

*Primary Examiner* — Jaweed A Abbaszadeh
*Assistant Examiner* — Brian J Corcoran
(74) *Attorney, Agent, or Firm* — JCIPRNET

(57) ABSTRACT

An electronic apparatus and a secure boot method thereof are provided. The electronic apparatus includes at least two connecting devices and a storage device. In the method, a current configuration of the connecting devices is detected, in which the current configuration includes one or a combination of a number, types, specifications and identifications of external devices connected with the connecting devices. Then, multiple preset configurations recorded in the storage device are retrieved and compared with the detected current configuration. If the current configuration matches one of the preset configurations, an apparatus function corresponding to the matched preset configuration is executed.

8 Claims, 2 Drawing Sheets

(56) References Cited

U.S. PATENT DOCUMENTS

| | | | |
|---|---|---|---|
| 2002/0133695 A1* | 9/2002 | Khatri | G06F 9/4411 713/1 |
| 2002/0143921 A1* | 10/2002 | Stephan | G06F 13/4081 709/223 |
| 2005/0071665 A1* | 3/2005 | Zimmer | G06F 9/441 726/26 |
| 2005/0071692 A1* | 3/2005 | Chaiken | G06F 9/4418 713/300 |
| 2006/0143716 A1* | 6/2006 | Ikemoto | G06F 21/57 726/27 |
| 2006/0218320 A1* | 9/2006 | Avraham | G06F 21/55 710/62 |
| 2006/0227759 A1* | 10/2006 | Bohm | G06F 13/4022 370/351 |
| 2008/0005262 A1* | 1/2008 | Wurzburg | G06F 13/4022 709/217 |
| 2008/0022360 A1* | 1/2008 | Bacastow | G06F 21/85 726/1 |
| 2009/0198842 A1* | 8/2009 | Basavaraju | G06F 9/4411 710/16 |
| 2009/0259835 A1* | 10/2009 | Perng | G06F 9/4411 713/1 |
| 2011/0060899 A1 | 3/2011 | Hsieh et al. | |
| 2011/0154011 A1* | 6/2011 | Efraim | G06F 21/572 713/100 |
| 2013/0014221 A1* | 1/2013 | Moore | G06F 21/85 726/3 |
| 2013/0086372 A1* | 4/2013 | Kojo | G06F 1/24 713/2 |
| 2013/0346660 A1* | 12/2013 | Kwidzinski | G06F 21/85 710/200 |
| 2014/0337558 A1* | 11/2014 | Powers | G06F 13/4072 710/313 |
| 2015/0019850 A1* | 1/2015 | Rivera | G06F 21/572 713/1 |
| 2015/0278055 A1* | 10/2015 | Dang | G06F 11/006 710/19 |
| 2016/0048436 A1* | 2/2016 | Yamazaki | G06F 11/2289 713/2 |
| 2016/0299865 A1* | 10/2016 | Hetzler | G06F 13/4068 |

* cited by examiner

ELECTRONIC APPARATUS AND SECURE BOOT METHOD THEREOF

CROSS-REFERENCE TO RELATED APPLICATION

This application claims the priority benefit of Taiwan application serial no. 105140563, filed on Dec. 8, 2016. The entirety of the above-mentioned patent application is hereby incorporated by reference herein and made a part of this specification.

BACKGROUND OF THE INVENTION

1. Field of the Invention

The present disclosure relates a boot method of an electronic apparatus and more particularly to an electronic apparatus and a secure boot method thereof.

2. Description of Related Art

A general computer start-up mechanism is the use of inputting a user's account and password. For example, it requires a user to input the account and password to confirm the identity of the user when the computer has just started up and executed a boot program of a basic input/output system (BIOS). However, the password authentication mechanism requires the user to manually enter the password every time the computer is powered on. This authentication mechanism not only has the risk of being unable to turn on the computer since the user may forget his/her password but also has the risk of password leakage.

Currently, the available products on the market provide biometric identifications, hardware locks, and other starting mechanisms. When the computer is powered on, the user needs to press the fingerprint or inserts the hardware lock into the specific connection device. After the computer confirms the fingerprint of the user or the identification code of the hardware lock, the system will continue the boot procedure. However, this practice requires additional hardware configuration beyond the computer, which increases the cost of the computer.

SUMMARY OF THE INVENTION

The present disclosure provides an electronic apparatus and a secure boot method thereof, through which an electronic apparatus can be securely booted up without increasing the cost of the computer.

The secure boot method of an electronic apparatus in the present disclosure is adapted for an electronic apparatus including at least two connecting devices and a storage device. The method is to detect a current configuration of the connecting devices, in which the current configuration includes one or a combination of a number, types, specifications and identifications of one or a plurality of external devices connected with the connecting devices. Next, a plurality of preset configurations recorded in the storage device are retrieved and compared with the detected current configuration, wherein if the current configuration matches one of the preset configurations, an apparatus function corresponding to the matched preset configuration is executed.

An electronic apparatus in the present disclosure includes at least two connecting devices, a storage device, and a processor. The connecting devices are configured to connect the external devices; the storage device is configured to store a plurality of preset configurations; and the processor is coupled to the connecting devices and the storage device and configured to detect a current configuration of the connecting devices and compare the detected current configuration with the preset configurations recorded in the storage device to execute an apparatus function corresponding to the matched preset configuration if the current configuration matches one of the preset configurations, wherein the current configuration comprises one or a combination of a number, types, specifications and identifications of the external devices connected with the connecting devices.

In view of the above, in the electronic apparatus and the secure boot method of the present disclosure, through the existing connecting devices of the electronic apparatus such as a universal serial bus (USB), different configurations of the external devices connected with the connecting devices are detected and compared with a plurality of preset configurations recorded in the electronic apparatus. The booting or the corresponding apparatus function is executed only if there is a matched configuration. This allows the user to change the configuration of the external devices only to ensure that the electronic apparatus can be booted securely without being stolen by the other user.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
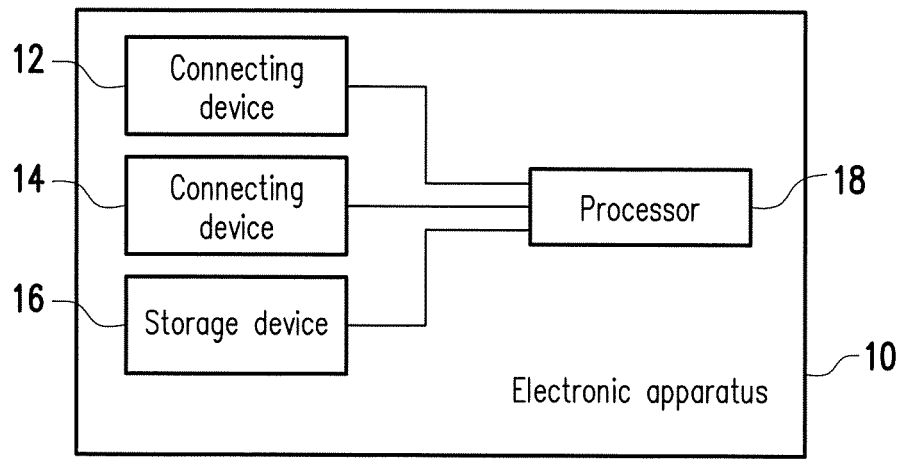
FIG. 1 is a block diagram illustrating an electronic apparatus according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

When a computer is powered on, the basic input/output system (BIOS) is first run to execute a power-on self test (POST) so as to perform a complete test and examination on the computer hardware. The present disclosure utilizes the examination results of the BIOS to compare the configuration of a plurality of connecting devices of an electronic apparatus connecting with external devices detected by the BIOS with a plurality of preset configurations which are previously established. By the comparison, a matched preset configuration is found such that an apparatus function corresponding to the matched preset configuration is executed. If no configuration are matched, the computer may be shut down or execute other alert actions. In this way, a user does not need to configure an additional hardware device on the electronic apparatus, and the secure booting can be achieved only by using the existing peripheral devices.

FIG. 1 is a block diagram illustrating an electronic apparatus according to an embodiment of the disclosure. Referring to FIG. 1, an electronic apparatus 10 in the present embodiment may be a computing device with computing capability such as a file server, a database server, an application server, a workstation, or a personal computer, including at least two connecting devices (connecting devices 12, 14 are exemplified in the present embodiment, but they are not limited thereto), a storage device 16 and a processor 18. Details are illustrated below.

The connecting devices 12, 14 are, for example, universal serial bus (BUS) interfaces, firewire interfaces, thunderbolt interfaces, high-definition multimedia interfaces (HDMI), card readers, and network ports, or other interface devices, etc., for connecting a computer peripheral device such as a flash drive, a mobile hard disk, a memory card, a mouse, a keyboard, or a computer screen, or connecting the user's mobile device such as a mobile phone, or a tablet computer. In this way, the electronic apparatus 10 may communicate with these external devices to transmit data.

The storage device 16 may be, for example, one or a combination of a stationary or mobile random access memory (RAM), a read-only memory (ROM), a flash memory, a hard drive or other similar devices or a combination of aforesaid devices, and is configured to record a plurality of preset configurations of the electronic apparatus 10 for hardware and the corresponding apparatus functions, where each of the preset configurations, for example, includes one or a combination of a number, types, specifications and identifications of external devices connected with the connecting devices 12, 14.

Figure 2:
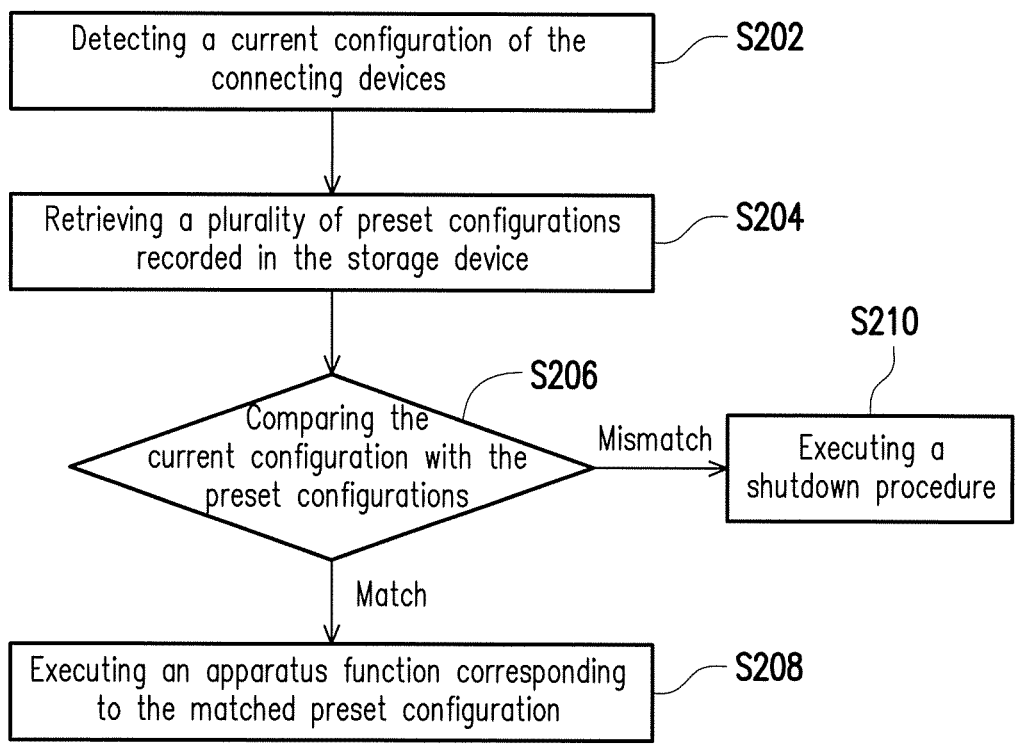
FIG. 2 is a flowchart illustrating a secure boot method of an electronic apparatus according to an embodiment of the disclosure.

The processor 18 is coupled to the connecting devices 12, 14 and the storage device 16 and may be a single-core or multi-core Central Processing Unit (CPU), or other programmable devices for general purpose or special purpose such as a microprocessor, a digital signal processor (DSP), a programmable controller, and an application specific integrated circuit (ASIC), or other similar devices, or a combination of above-mentioned devices, for instance. In the present embodiment, the processor 18 may retrieve and execute the program recorded in the storage device 16 for example, thereby implementing the secure boot method in the embodiment of the present disclosure FIG. 2 is a flowchart illustrating a secure boot method of an electronic apparatus according to an embodiment of the disclosure. Referring to FIG. 1 and FIG. 2 at the same time, the method of the present embodiment is adapted for the electronic apparatus 10 depicted in FIG. 1. A detailed flow for the secure boot method of the present embodiment will be described as below with reference to each component in the electronic apparatus 10.

First, the processor 18 may detect the current configuration of the connecting devices 12, 14 (step S202), in which the current configuration includes one or a combination of a number, types, specifications and identifications of the external devices connected with the connecting devices 12, 14. In an embodiment, when a user presses the power switch (not shown) of the electronic apparatus 10, the processor 18 may receive a boot signal, and at this moment the processor 18 may boot the electronic apparatus 10 to execute the BIOS. The BIOS executes a POST to detect the current configuration of the connection devices 12, 14.

More specifically, in the present embodiment, when the electronic apparatus 10 is powered on, by recognizing the configuration of the connecting devices 12 and 14 during the booting process, it is determined whether the boot procedure is continued so as to achieve the secure booting. The user of the electronic apparatus 10 may insert or connect a particular device to one or both of the connecting devices 12, 14 according to the preset configurations before powered on. At present, the processor 18 may detect the insertion of the external devices through the pins on the connecting devices 12 and 14, and connect to the external devices through the connecting devices 12 and 14 to read the device information of the external devices, where the device information includes a device specification, a product ID, a vendor ID, etc. The number and device information of external devices with which the above-mentioned connecting devices 12, 14 are connected are configured as the current configuration of the connecting devices 12, 14.

Next, the processor 18 may retrieve a plurality of preset configurations recorded in the storage device 16 (step S204) and compare the recorded preset configurations with the detected current configuration (step S206). Each of the above-mentioned preset configurations corresponds to different combinations of a number, types, specifications and identifications of the external devices and different apparatus functions.

If the processor 18 determines that the previous detected current configuration matches one of the above-described preset configurations, the apparatus function corresponding to the matched preset configuration is executed (step S208). Herein, the present embodiment can provide a plurality of secure boot-up mode with different degrees by providing a plurality of preset configurations. In an embodiment, the processor 18 may execute the operating system of the electronic apparatus 10 to get into a boot-up screen of the operating system after the boot procedure of the BIOS has been executed. However, in another embodiment, after the boot procedure of the BIOS has been executed, the processor 18 may similarly execute the operating system of the electronic apparatus 10, but disable a specific device or a specific function of the electronic apparatus 10 such that the electronic apparatus 10 is unable to use the specific device or the specific function during the operation of the operating system.

In particular, the concept of the embodiments described above are similar to the concept of logging in as a different identity, and a secure boot-up mechanism that differentiates different user identities so as to provide different system resources is provided. For example, a system administrator of the electronic apparatus 10 may use the configurations belonging to the administrator identity and connect the external devices (e.g. a flash drive storing an administrator identification code) with the connecting devices 12, 14, so that the electronic apparatus 10 may provide the system administrator with the power to manage the various devices or functions of the electronic apparatus 10 after the electronic apparatus 10 has entered the operating system; an ordinary user may use the configurations of the general identity and connect the external devices (e.g., a flash drive storing a user identification code) with the connecting devices 12, 14, so that the electronic apparatus 10 may provide the ordinary user with the power to manage the various devices or functions of the electronic apparatus 10, but unable to change the settings of those devices or functions; a visitor may use the configurations of the visitor identity and connect the external devices (e.g., the visitor's own flash drive) with the connecting devices 12, 14 so that the electronic apparatus 10 may provide the visitor with the basic functions of the electronic apparatus 10, but unable to use specific devices or specific functions, such as being unable to sign in particular web pages or download data.

On the other hand, if the processor 18 determines that the current configuration does not match any of the preset configurations, the processor 18 executes a shutdown procedure of the electronic apparatus (step S210). It should be noted that, in the present embodiment, the processor 18 executes the shutdown procedure in response to the configuration mismatch. However, in another embodiment, the processor 18 may also display a warning, issue an alert, suspend system operations, and so on in response to the configuration mismatch, but the disclosure is not limited thereto.

According to the above-described methods, the user only needs to connect the existing devices such as a flash drive to the corresponding connecting devices of the electronic apparatus according to the preset configurations before powered on, so that the security mechanism of the computer is released to enter the operating system after the booting is completed. If the configurations mismatch, the electronic apparatus may choose to be shut down or execute different functions to achieve the secure boot-up.

Take USB as an example, at the time of booting, the BIOS of the electronic apparatus may detect the state of the USB ports according to the USB specifications and read the USB basic category information as listed in Table 1 below. Then the BIOS may initialize the external devices connected to the USB ports and read the device category information as shown in Table 2 below. The fields in Table 2 having "?" means the use of binary decimal code and each "?" refers to a 4-bit unit, where the value range of "??" is 0xFF~0, and the value range of "????" is 0x9999~0. A manufacturer of the electronic apparatus may select a numerical value within the value range as required to set the value as the category information of each device for identification purposes, but the disclosure is not limited thereto. In detail, the BIOS may first check whether the electronic apparatus has a USB controller and how many USB ports are configured on the electronic apparatus. If the USB controller and USB ports are detected, the position and size for decoding may be set. Next, the BIOS may handshake with the external devices connected to the USB ports to check the vendors, speed, interfaces, or other information, etc. Finally, in accordance with the USB specifications, the information will be sequentially stored in the position defined by USB specifications. The information in the following Tables 1 and 2 is for illustrative purposes only, where the information may be set by the vendor before leaving the factory or set freely by the user, and the present embodiment is not limited thereto. Accordingly, whenever the electronic apparatus is powered on, the BIOS may sequentially check whether the original BIOS setting meets the current state of the USB ports and the types of the devices connected to the USB ports, so as to determine whether to execute a secure booting.

TABLE 1

| Basic category | Descriptor usage | Description |
|---|---|---|
| 00h | Device | |
| 01h | Interface | Audio |
| 02h | Both | Communication and CDC control |
| 03h | Interface | Human interface device |
| 05h | Interface | Physical |
| 06h | Interface | Image |
| 07h | Interface | Printer |
| 08h | Interface | Mass storage |
| 09h | Device | Hub |

TABLE 1-continued

| Basic category | Descriptor usage | Description |
|---|---|---|
| 0Ah | Interface | CDC-data |
| 0Bh | Interface | Smart card |
| 0Dh | Interface | Content security |
| 0Eh | Interface | Video |
| 0Fh | Interface | Personal health care |
| 10h | Interface | Audio/Video devices |
| 11h | Device | Billboard device class |
| 12h | Interface | USB Type-C bridge class |
| DCh | Both | Diagnostic device |
| E0h | Interface | Wireless controller |
| EFh | Both | Miscellaneous |
| FEh | Interface | Application specific |
| FFh | Both | Vendor specific |

TABLE 2

| Shift | Field | Size | Value | Description |
|---|---|---|---|---|
| 0 | Length | Byte | 12h | Size of descriptor, in bytes |
| 1 | Descriptor type | Byte | 01h | Device descriptor type |
| 2 | USB number | Word | ????h | USB specification release number |
| 4 | Device class | Byte | 00h | Basic class of the device |
| 5 | Device subclass | Byte | 00h | Subclass of the device |
| 6 | Device protocol | Byte | 00h | Protocol of the device |
| 7 | Maximum packet size | Byte | ??h | The maximum packet size for the endpoint 0 |
| 8 | Vendor ID | Word | ??h | Vendor ID (Specified by USB) |
| 9 | Product ID | Word | ????h | Product ID (Specified by the vendor) |
| 10 | Device number | Word | ????h | Device release number |
| 14 | Manufacturer index | Byte | ??h | Index of string descriptor describing the manufacturer |
| 15 | Product index | Byte | ??h | Index of string descriptor describing the product |
| 16 | Serial index | Byte | ??h | Index of string descriptor describing the device's serial number |
| 17 | Number of configurations | Byte | ??h | Number of possible configurations |

For example, in an embodiment, the electronic apparatus has 4 USB ports which specifications are 1.0, 2.0, 3.0 and 4.0 respectively. Assuming that the boot configuration of the electronic apparatus set by the user for the secure booting is: USB 3.0 port being connected to the printer. Accordingly, when a user presses a battery switch of the electronic apparatus, the BIOS of the electronic apparatus detects the state of the USB ports and initializes the external devices connected to the USB ports so as to determine that the basic type of the external device connected with the USB 3.0 is 07 h. By comparison with the preset configurations, the electronic apparatus may determine that the current configuration is one of the preset configurations, thereby performing a secure booting.

It should be noted that, in an embodiment, the electronic apparatus 10 may further memorize the last configuration before shutdown by the user and take it as a basis for comparison for the next booting. In this way, the user may change the configuration required to boot as needed to achieve the secure booting.

Figure 3:
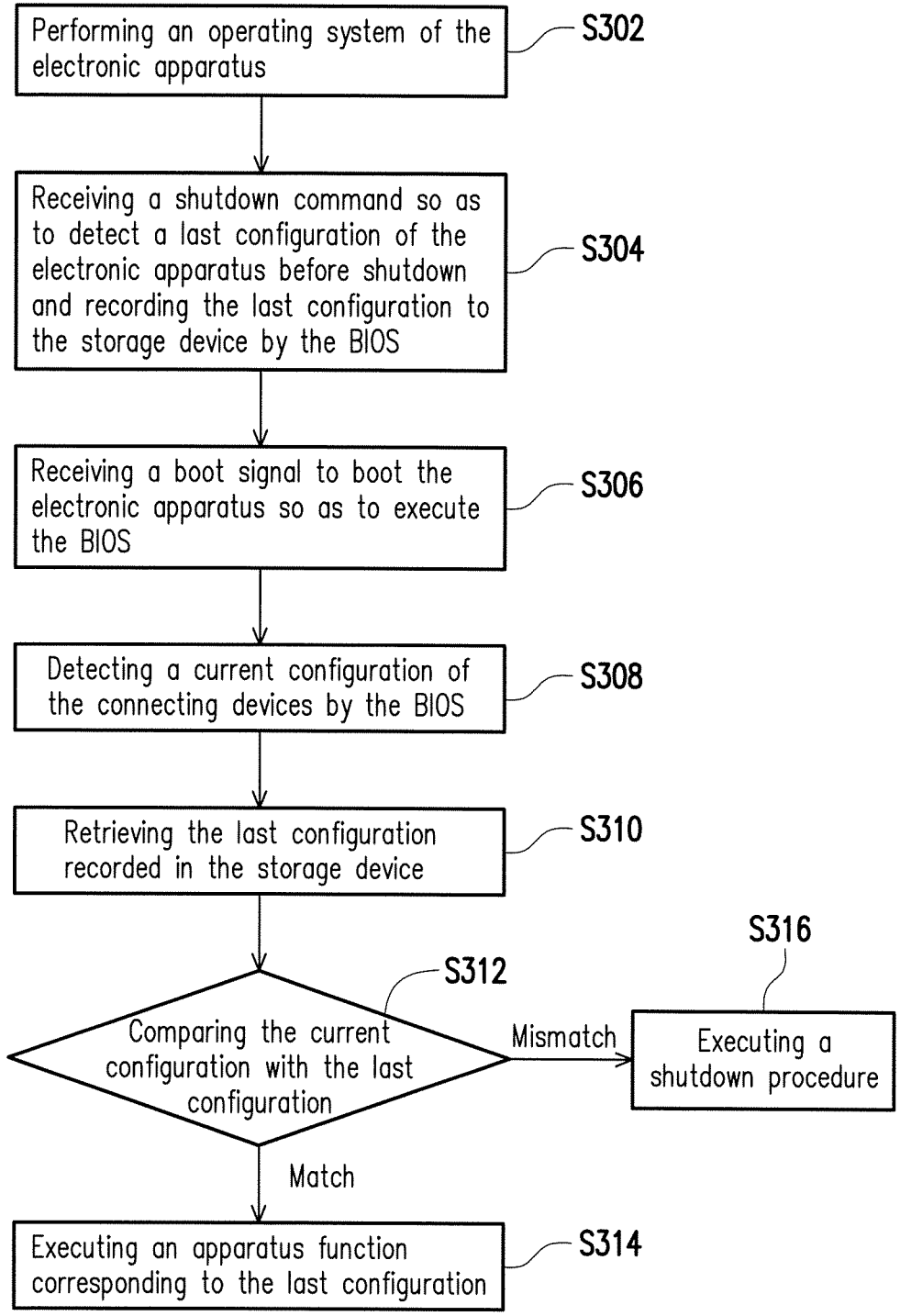
FIG. 3 is a flowchart illustrating a secure boot method of an electronic apparatus according to an embodiment of the disclosure.

For example, FIG. 3 is a flowchart illustrating a secure boot method of an electronic apparatus according to an embodiment of the disclosure. Referring to FIG. 1 and FIG. 3 at the same time, the method of the present embodiment is adapted for the electronic apparatus 10 depicted in FIG. 1. A detailed flow for the secure boot method of the present embodiment will be described as below with reference to each component in the electronic apparatus 10.

First, the processor 18 may execute the operating system of the electronic apparatus 10 (step S302). Herein, the processor 18 may confirm that the current configuration of the electronic apparatus 10 matches the preset configurations and then get into the operating system after booting through the flow shown in FIG. 2, for instance.

The user may perform a desired operation in the operating system. For example, the user may change the configuration of the external devices currently inserted to the connecting devices 12, 14 (for example, removing the flash drive) before shutdown and then press a shutdown bottom. At present, the processor 18 may receive a shutdown command so that the BIOS may detect a last configuration of the electronic apparatus 10 before shutdown and record the last configuration to the storage device 16 (step S304). When the user executes the shutdown procedure, the operating system may send a system management interrupt (SMI) signal to notify the BIOS to execute the shutdown procedure after the operating system has finished the shutdown procedure. At present, the BIOS may detect and record the last configuration of the electronic apparatus 10 before shutdown as a basis for comparison for the subsequent booting.

When the user turns on the electronic apparatus 10 next time, the processor 18 may receive a boot signal to boot the electronic apparatus 10 so as to execute the BIOS (step S306). The BIOS may detect the current configuration of the connecting devices 12, 14 (step S308). Then, the processor 18 may retrieve the last configuration recorded in the storage device 16 (step S310) and compare the recorded last configuration with the detected current configuration (step S312).

If the processor 18 determines that the current configuration matches the last configuration, the user is confirmed as the one who had used the electronic apparatus 10 last time and the apparatus function corresponding to the last configuration is executed (step S314). For example, the processor 18 may continue to execute the boot procedure of the BIOS and execute the operating system of the electronic apparatus 10. After entering the operating system, for example, the processor 18 may restore the previous system configuration before the last shutdown, such as re-running the previous application or re-opening the previous web pages before shutdown. On the other hand, if the processor 18 determines that the current configuration does not match any of the preset configurations, the processor 18 executes a shutdown procedure of the electronic apparatus (step S316).

By the above-described method, the electronic apparatus may enable the user to change the configuration before shutdown so that the electronic apparatus memorizes the user identity and the corresponding system configuration, and when the next booting is executed, the system configuration may be used to activate the electronic apparatus and restore the state before the last shutdown at the same time. Therefore, the purpose of secure booting and convenient operation is achieved.

To sum up, in the present disclosure, the electronic apparatus and the secure boot method thereof detect the configuration of the connecting devices of the electronic apparatus itself during booting, and compare the detected configuration with a plurality of preset configurations or with the last configuration before shutdown so as to identify the user identity, thus providing different degrees of operation authority to the user. Therefore, the purpose about secure booting is achieved.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A secure boot method of an electronic apparatus adapted for an electronic apparatus comprising at least two connecting interfaces and a storage device, wherein one or more external devices are connected with one or more of the at least two connecting interfaces, the method comprising:
   receiving a boot signal to boot the electronic apparatus to execute a basic input/output system (BIOS) which detects a current configuration of the at least two connecting interfaces, wherein the current configuration comprises a number of the one or more external devices and device information of the one or more external devices, and the device information comprises at least one kind information of types, specifications, and identifications of the one or more external devices;
   retrieving a plurality of preset configurations recorded in the storage device and comparing the detected current configuration with the recorded preset configurations, wherein each of the recorded preset configurations corresponds to different combinations of said number and said device information of at least one or more external devices connected with at least one of the at least two connecting interfaces, and a corresponding apparatus function; and
   executing the corresponding apparatus function of a matched preset configuration so as to provide different degrees of operation authority to a user when the current configuration matches one of the recorded preset configurations, wherein the step of executing the corresponding apparatus function comprises:
   executing an operating system of the electronic apparatus, and providing a system administrator access or disabling a specific device or a specific function of the electronic apparatus such that the electronic apparatus is unable to use the specific device or the specific function during the operation of the operating system,
   wherein the step of the BIOS detecting the current configuration of the connecting interfaces comprises:
   checking a universal serial bus (USB) controller of the electronic apparatus, a number of USB ports of the electronic apparatus and USB basic category information of the USB ports;
   handshaking with the one or more external devices connected with the USB ports to check the device information of the one or more external devices; and
   using the checked number of the USB ports and the device information of the one or more external devices as the current configuration.

2. The method as claimed in claim 1, wherein after the step of executing the operating system of the electronic apparatus, the method further comprises:
   receiving a shutdown command to set the BIOS to detect a last configuration of the electronic apparatus before shutdown and record the last configuration to the storage device.

3. The method as claimed in claim 2, wherein the step of retrieving the preset configurations recorded in the storage device and comparing the detected current configuration with the recorded preset configurations comprises:
   retrieving the last configuration recorded in the storage device and comparing the detected current configuration with the recorded last configuration; and executing an apparatus function corresponding to the last configuration if the current configuration matches the last configuration.

4. The method as claimed in claim 1, wherein the step of retrieving the preset configurations recorded in the storage device and comparing the detected current configuration with the recorded preset configurations further comprises:
executing a shutdown procedure of the electronic apparatus if the current configuration does not match any of the preset configurations.

5. An electronic apparatus, comprising:
at least two connecting interfaces, wherein one or more external devices are connected with one or more of the at least two connecting interfaces;
a storage device, storing a plurality of preset configurations, wherein each of the preset configurations corresponds to different combinations of a number of at least one or more external devices connected with at least one of the at least two connecting interfaces and device information of the at least one or more external devices, and a corresponding apparatus function, wherein the device information comprises at least one kind information of types, specifications, and identifications of the at least one or more external devices; and
a processor, coupled to the at least two connecting interfaces and the storage device, receiving a boot signal to execute a BIOS which detects a current configuration of the at least two connecting interfaces and comparing the detected current configuration with the preset configurations recorded in the storage device to execute the corresponding apparatus function of a matched preset configuration so as to provide different degrees of operation authority to a user when the current configuration matches one of the preset configurations, wherein the processor executing the corresponding apparatus function comprises executing an operating system of the electronic apparatus, and providing a system administrator access or disabling a specific device or a specific function of the electronic apparatus such that the electronic apparatus is unable to use the specific device or the specific function during the operation of the operating system,
wherein the current configuration comprises the number of the one or more external devices and the device information of the one or more external devices, wherein the processor comprises checking a USB controller of the electronic apparatus, a number of USB ports of the electronic apparatus and USB basic category information of the USB ports, and handshaking with the one or more external devices connected with the USB ports to check the device information of the one or more external devices so as to use the checked number of the USB ports and the device information of the one or more external devices as the current configuration.

6. The electronic apparatus as claimed in claim 5, wherein the processor further receives a shutdown command to set the BIOS to detect a last configuration of the electronic apparatus before shutdown and record the last configuration to the storage device.

7. The electronic apparatus as claimed in claim 6, wherein the processor comprises retrieving the last configuration recorded in the storage device and comparing the recorded last configuration with the detected current configuration after detecting the current configuration of the connecting interfaces, and executing the apparatus function corresponding to the last configuration if the current configuration matches the last configuration.

8. The electronic apparatus as claimed in claim 5, wherein the processor comprises executing a shutdown procedure of the electronic apparatus if the current configuration does not match any of the preset configurations.

* * * * *